(12) United States Patent
Endo et al.

(10) Patent No.: US 7,829,218 B2
(45) Date of Patent: Nov. 9, 2010

(54) PROTON CONDUCTIVE ELECTROLYTE AND FUEL CELL COMPRISING THE SAME

(75) Inventors: Hiroko Endo, Yokohama (JP); Hiroyuki Nishide, Tokyo (JP); Atsuo Sonai, Yokohama (JP); Takahiro Tago, Tokyo (JP)

(73) Assignee: Samsung SDI Co., Ltd, Suwon-si, Gyeonggi-do (KR)

( * ) Notice: Subject to any disclaimer, the term of this patent is extended or adjusted under 35 U.S.C. 154(b) by 850 days.

(21) Appl. No.: 11/650,956

(22) Filed: Jan. 9, 2007

(65) Prior Publication Data

US 2007/0212585 A1 Sep. 13, 2007

(30) Foreign Application Priority Data

| Mar. 9, 2006 | (JP) | .............................. 2006-064139 |
| Mar. 9, 2006 | (JP) | .............................. 2006-064140 |
| Jun. 20, 2006 | (KR) | ...................... 10-2006-0055414 |

(51) Int. Cl.
*H01M 6/04* (2006.01)
*H01M 6/18* (2006.01)
*H01M 8/10* (2006.01)

(52) U.S. Cl. ........................ 429/188; 429/304; 429/314; 429/491; 429/492; 521/27

(58) Field of Classification Search ................. 429/188, 429/304, 314, 184, 491, 492; 521/27
See application file for complete search history.

(56) References Cited

U.S. PATENT DOCUMENTS 7,560,184 B2 * 7/2009 Sonai et al. .................... 429/33
2002/0103327 A1 8/2002 Claub et al.
2005/0196658 A1 * 9/2005 Sonai et al. .................... 429/33

FOREIGN PATENT DOCUMENTS

| CN | 1664009 | 9/2005 |
| JP | 2003-31231 | 1/2003 |
| JP | 2005-251523 | 9/2005 |
| JP | 2007-165071 | 6/2007 |
| JP | 2007-242452 | 9/2007 |
| KR | 2005-89125 | 9/2005 |
| WO | WO 96/29359 | 9/1996 |

OTHER PUBLICATIONS

Claims of Japanese Laid-Open Publication 11-502245.
Kobayashi et al. "Proton-conducting polymers derived from poly(ether-etherketone) and poly(4-phenoxybenzoyl-1,4-phenylene)" Solid State Ionics 106 (1998), pp. 219-225.

* cited by examiner

*Primary Examiner*—Patrick Ryan
*Assistant Examiner*—Julian Mercado
(74) *Attorney, Agent, or Firm*—Lee & Morse, P.C.

(57) ABSTRACT

Aspects of the present invention provide a proton conductive electrolyte suitable for a fuel cell material and a fuel cell including the proton conductive electrolyte. More particularly, aspects of the present invention provide a proton conductive electrolyte that has good proton conductivity and can be used to form a membrane having good flexibility. As a result, the proton conductive electrolyte can be used in a fuel cell, the electrolyte membrane of a fuel cell or the electrodes thereof, and can provide a solid polymer fuel cell having high current density, high power and long life-time in a dry environment (relative humidity of 50% or less) at an operating temperature of 100 to 200° C.

22 Claims, 3 Drawing Sheets

PROTON CONDUCTIVE ELECTROLYTE AND FUEL CELL COMPRISING THE SAME

CROSS-REFERENCE TO RELATED APPLICATION

This application claims the benefit of Japanese Patent Application Nos. 2006-64139 and 2006-64140, both filed on Mar. 9, 2006 in the Japan Patent Office, and Korean Patent Application No. -2006-55414, filed on Jun. 20, 2006 in the Korean Patent Office, the disclosures of which are incorporated herein in their entirety by reference.

BACKGROUND OF THE INVENTION

1. Field of the Invention

Aspects of the present invention relate to a proton conductive electrolyte suitable for a fuel cell material and to a fuel cell including the proton conductive electrolyte. More particularly, aspects of the present invention relate to a proton conductive electrolyte that has good proton conductivity and provides good flexibility in a membrane formed using the proton conductive electrolyte. As a result, the proton conductive electrolyte can be used in an electrolyte membrane of a fuel cell or the electrodes thereof, and can provide a solid polymer fuel cell having high current density, high power and long life-time in a dry environment (relative humidity of 50% or less) at an operating temperature of 100 to 200° C., as well as a fuel cell including the same.

2. Description of the Related Art

Fluorinated polyethylene sulfonic acid is widely used to form electrolyte membranes for fuel cells that are used for salt electrolysis or sea water desalination, water treatment, etc., since the membranes have high proton conductivity and excellent chemical stability. For example, a NAFION® (DuPont) membrane, a FLEMION® (Asahi Glass) membrane, an ACIPLEX® (Asahi Kasei Chemicals) membrane, etc are commercially available. However, these electrolyte membranes contain fluorine, and thus, the membranes have a bad impact on the environment, and are also expensive.

For electrolyte membranes not including fluorine, polystyrene sulfonic acid has been proposed as an ion exchange resin for water treatment or ion exchange membrane, etc., and a sulfonated aromatic polymer has been proposed for a fuel cell (Japanese Laid-open Publication No. hei 11-502245, T. Kobayashi, M. Rikukawa, K. Sanui, N. Ogata, Solid State Ionics, 106, 1998, p. 219). However, the membranes do not have the substantial heat resistance and chemical stability required for a fuel cell.

That is, in terms of power generation efficiency or system efficiency of a fuel cell and the long-term durability of its components, a fuel cell needs to have good electricity generating performance over a long-period of time at an operating temperature of 100 to 200° C. in a dry environment (non-humidified or a relative humidity of 50% or less). However, when the materials described above are used in an electrolyte membrane for a fuel cell, stable performance cannot be achieved.

In order to improve the electricity generating performance of a fuel cell, the proton conductivity must be increased. This can be done by increasing the concentration of the functional group of an aromatic polymer used in the electrolyte membrane. However, when the concentration of the functional group is higher, the flexibility of the electrolyte membrane is reduced, and the membrane is likely to be fragile.

The inventors of an aspect of the present invention have performed research in order to solve the problems. They have been able to form a membrane where the polyamidic acid maintains flexibility even when a sulfonamide group is incorporated at a high concentration. They have also been able to use polyamidic acid as a precursor and make polyamidic derivatives having high proton conductivity and good flexibility.

SUMMARY OF THE INVENTION

An aspect of the present invention provides a proton conductive electrolyte suitable for use in a solid polymer fuel cell where the membrane has good proton conductivity, good flexibility, and stable electricity generating performance for a long period of time in operating conditions as described above. Another aspect of the present invention provides a fuel cell incorporating the proton conductive electrolyte in the membrane.

Another aspect of the present invention, provides a first proton conductive electrolyte comprising polyamidic acid derivatives in which a carboxyl group or a sulfamic acid group is incorporated as a side chain in the polyamide and an alkyl group is incorporated in the main chain of the polyamide.

Preferably, the polyamidic acid derivatives are represented by Formula 1 below:

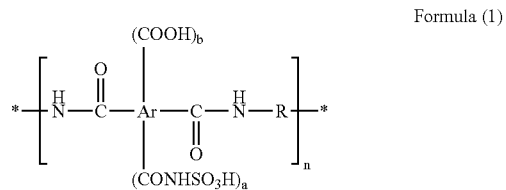

Formula (1)

where Ar refers to an aromatic ring or a group including an aromatic ring, R refers to an alkyl group, $0 \leq a \leq 2$, $0 \leq b \leq 2$ and $a+b=2$, and n refers to the average polymerization degree and is an integer in the range of $10^2$-$10^4$.

In addition, in this first proton conductive electrolyte, R of the polyamidic acid derivatives of Formula 1 is preferably a C3-C12 alkyl group.

In the first proton conductive electrolyte, the polyamidic acid derivatives are compounds in which the carboxyl group of the side chain of polyamidic acid is completely or partially reacted with sulfamic acid.

The polyamidic acid derivatives are obtained by completely or partially reacting a carboxyl group side chain of polyamidic acid with carbonyl chloride, reacting the resulting product with amidosulfonate triethylamine salts, and then cation exchanging the resulting product.

According to another aspect of the present invention, there is provided a fuel cell comprising a pair of electrodes and an electrolyte membrane interposed in each electrode, wherein the electrolyte membrane comprises the first proton conductive electrolyte.

In the fuel cell, the first proton conductive electrolyte is included in a portion of the electrodes.

Meanwhile, based on the fact that polyvinyl sulfamic acid having high proton conductivity and heat resistance can be prepared from a precursor having good solubility and heat resistance in spite of a large molecular weight, one aspect of the present invention provides a second proton conductive electrolyte comprising polyvinyl sulfamic acid copolymer represented by Formula 2 below:

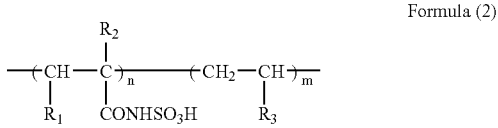

Formula (2)

where $R_1$ refers to H, COOH, CONHSO$_3$H or an aromatic group, $R_2$ refers to H or CH$_3$, $R_3$ refers to COOH, an alkoxy group, a halogen group, an ester group or an aromatic group, and each of m and n is average polymerization degree and is an integer in the range of $10^2$-$3\times10^4$.

The fuel cell comprises a pair of electrodes and an electrolyte membrane interposed in each electrode, wherein the electrolyte membrane comprises the second proton conductive electrolyte.

In the fuel cell, the second proton conductive electrolyte is included in a portion of the electrodes.

A third proton conductive electrolyte is obtained by mixing polyamidic acid derivatives represented by Formula 1 with polyvinylsulfamic acid copolymer represented by Formula 2.

A mixing ratio of the polyamidic acid derivatives and the polyvinylsulfamic acid copolymer refers to a mass ratio and is in the range of 9/1-1/1.

The fuel cell comprises a pair of electrodes and an electrolyte membrane interposed in each electrode, wherein the electrolyte membrane comprises the third proton conductive electrolyte.

In the fuel cell, the third proton conductive electrolyte is included in a portion of the electrodes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
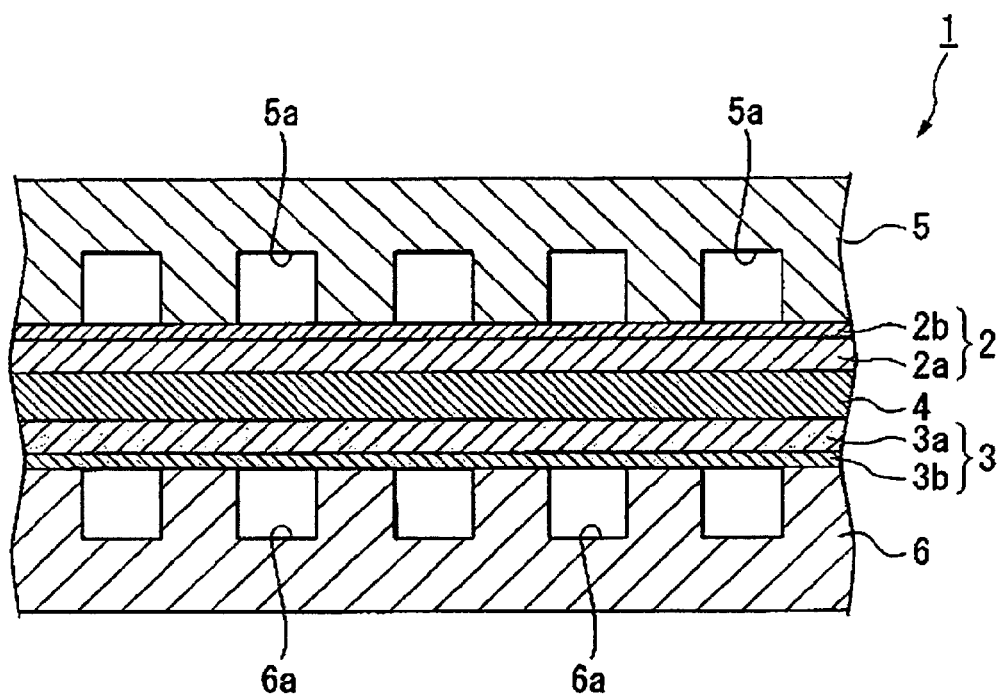
FIG. 1 is a schematic cross-sectional view of a unit cell of a fuel cell employing a proton conductive electrolyte according to an embodiment of the present invention.

Reference will now be made in detail to particular embodiments of the present invention, examples of which are illustrated in the accompanying drawings, wherein like reference numerals refer to the like elements throughout. The embodiments are described below in order to explain the present invention by referring to the figures.

[Proton Conductive Electrolyte]
[Derivative of Polyamidic Acid]

A first proton conductive electrolyte according to one embodiment of the present invention comprises a derivative of polyamidic acid in which a carboxyl group or a sulfamic acid group is incorporated as a side chain in the polyamide and an alkyl group is incorporated in the main chain.

In this embodiment of the present invention, by including an alkyl group in the main chain of a polyamide, an electrolyte membrane can be formed having excellent flexibility. In addition, when a sulfamic acid group is incorporated at high concentration into the side chain of the polyamide, a derivative of polyamidic acid having high proton conductivity is obtained. Accordingly a proton conductive electrolyte is obtained that has high proton conductivity and that can also be used to form a membrane having good flexibility The derivative of polyamidic acid according to this embodiment of the present invention is preferably a compound represented by Formula 1 below:

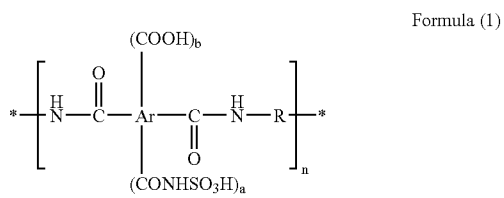

Formula (1)

where Ar refers to an aromatic ring or a group including an aromatic ring, R refers to an alkyl group, $0\leq a\leq 2$, $0\leq b\leq 2$ and $a+b=2$, and n refers to average polymerization degree and is an integer in the range of $10^2$-$10^4$.

The aromatic ring or the group including an aromatic ring can be a phenyl group or a naphthyl group, etc., but is not limited thereto.

In addition, the R may be a C3-C12 alkyl group.

In addition, the polyamidic acid derivative is preferably a compound in which a carboxyl group side chain of polyamidic acid is completely or partially reacted with sulfamic acid.

In addition, the polyamidic acid derivative is preferably a compound obtained by completely or partially reacting a carboxyl group side chain of polyamidic acid with carbonyl chloride, reacting the resulting product with amidosulfonate triethylamine salts, and then cation exchanging the resulting product.

Meanwhile, the ratio [a/(a+b)] of the functional side groups of the polyamidic acid derivatives represented by Formula 1 is preferably in the range of 80-100%. When the ratio of the functional groups (a/b) is less than 80%, substantial proton conductivity is not obtained.

In a conventional proton conductive electrolyte, when a sulfamic acid group is employed as a side chain of polyamide at a high concentration, flexibility of an electrolyte membrane formed using the same is reduced to the point that the membrane can be fragile.

In this embodiment of the present invention, polyamidic acid derivatives comprise polyamide including an alkyl group in the main chain. Therefore, even when a sulfamic acid group is employed as a side chain of polyamide at a high concentration, the flexibility of the electrolyte membrane formed is excellent, thereby preventing the membrane from being fragile. As a result, a proton conductive electrolyte having high conductivity is obtained that can be used to form a membrane having good flexibility.

Accordingly, the first proton conductive electrolyte according to this embodiment of the present invention can be usefully employed in a fuel cell as an electrolyte membrane, even when polyamidic acid derivatives are the only polymers used.

[Polyvinyl Sulfamic Acid Copolymer]

A second proton conductive electrolyte according to another embodiment of the present invention comprises polyvinyl sulfamic acid copolymer represented by Formula 2 below:

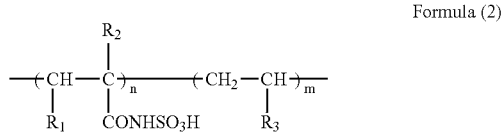

Formula (2)

where $R_1$ is H, COOH, CONHSO$_3$H or an aromatic group, $R_2$ is H or CH$_3$, $R_3$ refers to COOH, an alkoxy group, a halogen group, an ester group or an aromatic group, and each of m and n is the average polymerization degree and is an integer in the range of $10^2$-$3\times10^4$.

The aromatic group can be a phenyl group, a naphthyl group, etc., and is not limited thereto.

In this embodiment of the present invention, the average polymerization ratio (n/m) of the polyvinyl sulfamic acid copolymer represented by Formula 2 is preferably in the range of 3/7-7/3. When the average polymerization ratio (n/m) of polyvinyl sulfamic acid copolymer is less than 3/7, substantial proton conductivity cannot be obtained. When the average polymerization ratio (n/m) of polyvinyl sulfamic acid copolymer is greater than 7/3, the copolymer is soluble in water.

Polyvinyl sulfamic acid copolymer, as represented by Formula 2, included in the second proton conductive electrolyte includes a methylene group adjacent to the CH—R$_3$ in the m component, thereby having good solubility in solvents. Accordingly, the ratio of the functional group of polyvinyl sulfamic acid copolymer is higher, and proton conductivity is improved.

In addition, the polyvinyl sulfamic acid copolymer of Formula 2 can be a copolymer having large molecular weights. In this case, as the molecular weight is increased, heat resistance is improved.

Accordingly, the second proton conductive electrolyte according to this embodiment of the present invention can be usefully employed in a fuel cell as an electrolyte membrane, even when polyvinyl sulfamic acid copolymers are the only polymers used.

[Polyamidic Acid+Polyvinyl Sulfamic Acid]

The third proton conductive electrolyte is obtained by mixing polyamidic acid derivatives of Formula 1 and polyvinyl sulfamic acid copolymer of Formula 2.

The third proton conductive electrolyte is obtained by mixing the polyamidic acid derivatives, which can be used to form an electrolyte membrane having good flexibility, and the polyvinyl sulfamic acid. Therefore, the third proton conductive electrolyte has excellent proton conductivity and an electrolyte membrane formed using the third proton conductive electrolyte is improved.

In addition, in this embodiment of the present invention, a mixing ratio of polyamidic acid derivatives of Formula 1 and polyvinyl sulfamic acid copolymer of Formula 2 refers to a mass ratio and is in the range of 9/1-1/1. When the mixing ratio is within this range, the proton conductivity of the third proton conductive electrolyte and the flexibility of an electrolyte membrane formed using the third proton conductive electrolyte are improved.

[Method of Preparing a Proton Conductive Electrolyte]
(Polyamidic Acid Derivatives)

Polyamidic acid derivatives represented by Formula 1 used in the proton conductive electrolyte according to the current embodiment of the present invention can be polymerized by the following process.

Sulfonated polyamidic acid is easily prepared using polyamidic acid derivatives by sulfonating a carboxyl group in a side chain of polyamidic acid.

In particular, polyamidic acid derivatives are preferably prepared by reacting the carboxyl group in the side chain of polyamidic acid with carbonyl chloride, reacting the resulting product with amidosulfonate triethylamine salts, and then cation exchanging the resulting product.

Such preparation of polyamide sulfamic acid is illustrated in Reaction Formula 1 below.

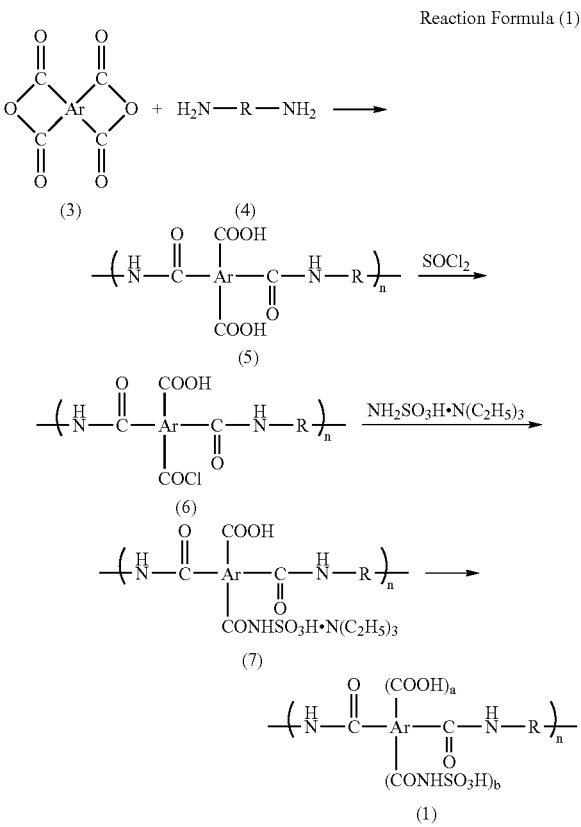

Reaction Formula (1)

As illustrated in Reaction Formula 1, polyamidic acid of Formula 5 used as a starting polymer can be produced by condensation polymerization of aromatic tetraacetic acid dianhydride of Formula 3 and aromatic diamine of Formula 4. In addition, Ar, R, and n of Formulae 3 through 5 refer to the same compositions of Formula 1 (the target product).

The polyamidic acid thus produced (5) and thionyl chloride (SOCl$_2$) are then mixed and stirred in an amide-based solvent at room temperature or low temperature for a few hours up to 24 hours. Accordingly, the carboxyl group in one side chain of polyamidic acid (5) is completely, or at least partially substituted with a carbonyl chloride group. In Formula 6 as shown, only one side of the carboxyl groups in a side chain of polyamidic acid (5) is substituted with a carbonyl chloride group, and the other side of the carboxyl group remains unsubstituted, but the other side can be also substituted with a carbonyl chloride group. An amide-based solvent used in this process can be N,N'-dimethylacetamide, N,N'-dimethylformamide, etc. After the reaction is completed, the reaction solution is poured into methanol, and the precipitates are filtered and washed to separate the polymer (6) thus produced.

The obtained polymer (6) and amidosulfonate triethylamine salts ($NH_2SO_3H.N(C_2H_5)_3$) are mixed and stirred in an amide-based solvent at room temperature or low temperature for a few hours up to 24 hours to produce the polyamide sulfamic acid triethylamine salts of Formula 7. In Formula 7 as shown, only the one side chain of polyamidic acid (5) that has been reacted with carbonyl chloride is converted to sulfamic acid salts. However, as described above, when the carboxyl group in the other side chain is also reacted with carbonyl chloride, the side chain on the other side can be also converted to sulfamic acid salts. The amide-based solvent used in this process is the same as in the carbonyl chloride reaction process discussed above. After the reaction is completed, methanol is poured into the reaction solution, and the precipitates are filtered and washed to separate the polymer (7) thus produced.

Finally, a solution of the obtained polyamide sulfamic acid triethylamine salts (7) (for example, N,N'-dimethylacetamide solution, etc.) is passed through a cation exchange resin to protonize the resulting product, where the sulfamic acid salt is converted to sulfamic acid. Methanol, dichloromethane, or chloroform are poured into the reaction solution and the precipitates are separated and washed to obtain the polyamidic acid derivative (Formula 1), which is the target product.

In the reaction shown above, the amidosulfonate group is substituted only on some of the polyamidic acid side chains. However, as described above, the reactions in the side chains of polyamidic acid are not limited, and thus a portion of the side chains on one side of the polyamidic acid or all of the side chains on one side of the polyamidic acid can be converted to a sulfamic acid group.

Furthermore, as described above, polyamidic acid derivatives of Formula 1 can be made where both sides of the polyamidic acid are substituted such that $0 \leq a \leq 2$, $0 \leq b \leq 2$ and $a+b=2$.

(Polyvinyl Sulfamidic Acid)

Polyvinyl sulfamic acid of Formula 2 used in a proton conductive electrolyte is synthesized by aminosulfonating a raw material polymer.

When polyvinyl sulfamic acid is synthesized by aminosulfonating the raw material polymer, the following processes can be used.

First, the starting polymer is a raw material polymer having at least one COOH, for example, polyacrylic acid, dissolved in dehydrated N,N'-dimethylformamide (DMF). Then, thionyl chloride is slowly added to the resulting product under a nitrogen atmosphere, and the polymer solution is stirred at room temperature for 24 hours.

Next, a sulfonamide and triethylamine are mixed with dehydrated dichloromethane to produce amidosulfonate triethylamine salts, the resulting solution is slowly added to the polymer solution under a nitrogen atmosphere, and the resulting product is stirred at room temperature for 16 hours.

Then, the reaction solution is removed under a reduced pressure at 50° C., and pure water is added, and the resultant is stirred at room temperature for one hour. The precipitate is filtered, and washed with pure water, and then heated and dried in vacuum at 70° C. for a day to obtain a light brown powder of polyvinyl sulfamic acid triethylamine salts. The powder of polyvinyl sulfamic acid triethylamine salts is dissolved in dimethylformamide (DMF), and is passed through a cation exchange resin. The cation exchanged solution is then concentrated and added to pure water to separate the precipitates. The separated precipitates are washed with pure water, and then heated and dried in vacuum at 70° C. for a day to obtain a light brown powder of polyvinyl sulfamic acid.

This method of preparing polyvinyl sulfamic acid used in the proton conductive electrolyte according to this second embodiment of the present invention is not limited to the method as described above. For example, polyvinyl sulfamic acid can be polymerized using vinyl monomer as a raw material by incorporating an amidosulfonic acid group in the vinyl monomer in advance.

In addition, the proton conductive electrolyte can include components besides polyvinyl sulfamic acid and polyamide sulfamic acid, that is not outside the scope of the present invention.

For example, to enhance the strength of an obtained electrolyte membrane, a fluoride-containing polymer such as polytetrafluoroethylene (PTFE), or the like can be used with the above polymers as a reinforcing agent.

Furthermore, a nitrogen-containing polymer, oxygen-containing polymer, sulfur-containing polymer, or the like having a basic property can be used with the above polymers, and can be used as an ion complex electrolyte.

In addition, orthophosphates, metaphosphates, polyphosphates, and the like. can be used with the above polymers, and can be used as a gel electrolyte.

The proton conductive electrolyte according to a third embodiment of the present invention comprises polyamidic acid derivatives, polyvinyl sulfamic acid copolymers or mixtures thereof. Therefore, the proton conductive electrolyte can exhibit high proton conductivity, good heatresistance, and can be used to form a membrane having good flexibility.

[Fuel Cell]

FIG. 1 is a cross-sectional view of a unit cell of a fuel cell according to one embodiment of the present invention. In FIG. 1, the unit cell of a fuel cell 1 includes an oxygen electrode 2, a fuel electrode 3, a proton conductive electrolyte membrane 4 according to an embodiment of the present invention interposed between the oxygen electrode 2 and the fuel electrode 3 (hereinafter, referred to as electrolyte membrane 4), an oxidizing agent bipolar plate 5 having oxidizing agent flow paths 5a disposed on the external surface of the oxygen electrode 2, and a fuel bipolar plate 6 having fuel flow paths 6a disposed on the external surface of the fuel electrode 3. The unit cell 1 operates at 100-200° C., and in a dry environment with a relative humidity of 50% or less.

In addition, in the fuel cell according to this embodiment of the present invention, the electrolyte membrane 4 comprises the proton conductive electrolyte according to one of the embodiments of the present invention. Also, the proton conductive electrolyte can be a component both of the oxygen electrode 2 and fuel electrode 3.

The fuel electrode 3 and the oxygen electrode 2, respectively, include porous catalyzing layers 2a and 3a, and porous carbon sheets 2b and 3b that, respectively, support each of the porous catalyzing layers 2a and 3a. The porous catalyzing layers 2a and 3a include an electrode catalyst, a hydrophobic binder for solidifying and shaping the electrode catalyst, and a conducting agent.

The electrode catalyst can be any metal that catalyzes the oxidation reaction of hydrogen and the reduction reaction of oxygen. Examples of the electrode catalyst include, but are not limited to, lead (Pb), iron (Fe), manganese (Mn), cobalt (Co), chrome (Cr), gallium (Ga), vanadium (V), tungsten (W), ruthenium (Ru), iridium (Ir), palladium (Pd), platinum (Pt), and rhodium (Rh) or alloys thereof. These metals or alloys are supported on activated carbon to constitute the electrode catalyst.

The hydrophobic binder is preferably the proton conductive electrolyte according to embodiments of the present invention discussed above, but can also be a fluoro resin that is water repellent. In that case, a fluoro resin having a melting point of 400° C. or less is preferable. Such fluoro resin can also be a resin having good hydrophobic properties and heat resistance such as polytetrafluoroethylene, tetrafluoroethylene-perfluoroalkyl vinyl ether copolymer, poly vinylidene fluoride, tetrafluoroethylene-hexafluoroethylene copolymer, perfluoroethylene, etc. By adding the hydrophobic binder, the catalyzing layers 2a and 3a can be prevented from excessive wetting by the water formed during generation of electricity, and thus prevent inhibition of diffusion of fuel gases and oxygen inside of the fuel electrode 3 and of the oxygen electrode 2.

In addition, the conducting agent can be any electricity-conducting material, for example, most metals or many forms of carbon. Examples of a carbon material used as the conducting agent include carbon black such as acetylene black, etc., activated carbon and graphite used independently or in combination.

In addition, the catalyzing layers 2a and 3a can include the proton conductive electrolyte according to embodiments of the present invention discussed above without the hydrophobic binder, or with the hydrophobic binder. By adding the proton conductive electrolyte, proton conductivity in the fuel electrode 3 and the oxygen electrode 2 can be improved, and internal resistance of the fuel electrode 3 and the oxygen electrode 2 can be reduced.

The oxidizing agent bipolar plate 5 and the fuel bipolar plate 6 are formed of a conductive metal, etc., and are joined to the oxygen electrode 2 and the fuel electrode 3 to act as a current collector and supply oxygen and fuel gases to the oxygen electrode 2 and fuel electrode 3, respectively. That is, hydrogen as a fuel in the form of a gas is supplied to the fuel electrode 3 via the fuel flow paths 6a of the fuel bipolar plate 6 and oxygen as an oxidizing agent is supplied to the oxygen electrode 2 via the oxidizing agent flow paths 5a of the oxidizing agent bipolar plate 5.

The hydrogen supplied as a fuel may be hydrogen produced by dehydrogenation of a hydrocarbon or an alcohol and the oxygen supplied as an oxidizing agent may be oxygen in the air.

In the unit cell 1, hydrogen is oxidized at the fuel electrode 3 to produce protons, which migrate to the oxygen electrode 2 via the electrolyte membrane 4. The migrated protons electrochemically react with oxygen to produce water and electrical energy.

The fuel cell according to this embodiment of the present invention is a solid polymer fuel cell having high current density, a large output of power, a long life-time and exhibiting good electricity generating performance for that long period of time in a dry environment at a relative humidity of 50% or less at an operating temperature of 100 to 200° C. Such a fuel cell can be used for cars, power generation at home, or other portable applications.

EXAMPLE

Hereinafter, aspects of the present invention will be described in greater detail with reference to the following examples. These examples are for illustrative purposes only and are not intended to limit the scope of the present invention.

Example 1

Preparation of Polyamidic Acid]

Polyamidic acid, a precursor of polyamidic acid derivatives, was synthesized by the following process. Here, a target product was a compound represented by Formula 1 where Ar is benzene, and R is $(CH_2)_{10}$.

First, 3.45 g of 1,10-diaminodecane (20 mmol) was dissolved in 170 mL of dehydrated N,N'-dimethylformamide (DMF), 4.36 g of pyromellitic anhydride (20 mmol) recrystallized from acetone/hexane was slowly added to the resulting solution, and the resulting solution was stirred at 700 rpm, at 15° C. for one hour and then at 25° C. for 60 hours and then reacted. Next, the reaction solution was precipitated in 4 L of acetone/hydrochloric acid (1/4), the resulting solution was collected by filtering, and the collected resulting product was washed with 1 mol/L of an aqueous hydrochloric acid solution and acetone, heated and dried in a vacuum at 60° C. for 36 hours This procedure yielded a white powder of 7.65 g (yield 98%) of polyamidic acid represented by Formula 8.

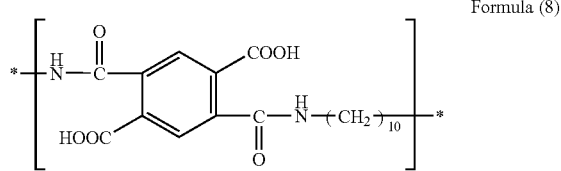

Formula (8)

$^1$H-NMR spectroscopy(DMSO-$d_6$, 500 MHz) of the resulting white powder produced a spectrum of 1.20-1.38 (br, —$CH_2$—), 1.43-1.57 (br, —$CH_2$—), 3.13-3.24 (br, —$CH_2$—), 7.34, 7.68, 8.08(s, Ph), 8.39, 8.44(m, NH),. IR spectroscopy produced an absorption spectrum of (1719, 1655 cm$^{-1}$($v_{C=O}$)) due to the carbonyl group.

The polyamidic acid formed by the above process is soluble in DMF, N,N'-dimethylacetamide (DMAc), N-methylpyrrolidone (NMP), dimethylsulfoxide (DMSO), and the like, and insoluble in water, methanol, chloroform, hexane, benzene, or toluene.

[Preparation of Polyamidic Acid Derivatives]

1.17 g (3 unit mmol) of polyamidic acid (8) prepared as above was dissolved in 100 mL of dehydrated DMF. 1.78 g (15 mmol) of thionyl chloride was slowly added to the resulting solution under nitrogen atmosphere, and the resulting product was stirred at room temperature for 6 hours. Next, 2.91 g (30 mmol) of sulfamic acid (manufactured by Kishida Chemistry Co.) and 3.03 g (30 mmol) of triethylamine were mixed with 15 mL of dehydrated dichloromethane to produce amidosulfonate triethylamine salts. Then, the resulting product was slowly added to the polymer solution under nitrogen atmosphere, and stirred at room temperature for 16 hours. The solvent of the reaction solution was removed in pressure at 50° C., and then 100 mL of pure water was added and the resulting product was stirred at room temperature for one hour. Then, the resulting solution was centrifuged at 4000 rpm for 10 minutes and then the supernatant was removed and the remaining solids were filtered. The collected resulting product was dissolved in 100 mL of DMF, passed through 250 mL of cation exchange resin (manufactured by Organo Corp. AMBERLYST® 15JWET) and proton exchanged. The treated solution was concentrated to 10 ml and added to 200 mL of pure water to separate the precipitates. Then, the resulting product was heated and dried in vacuum at 70° C. for a day to obtain a light brown powder of 0.68 g (yield 42%) of polyamide sulfamic acid represented by Formula 9 below.

Formula (9)

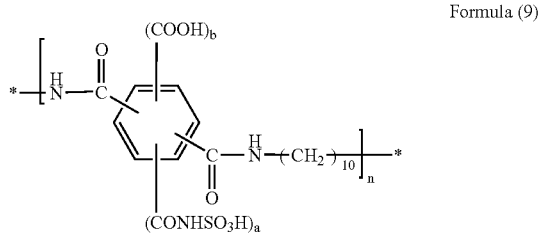

$^1$H-NMR spectroscopy(DMSO-$d_6$, 500 MHz) of the obtained light brown powder produced a spectrum of 1.20-1.35(br, —$CH_2$—), 1.49-1.65(br, —$CH_2$—), 3.20-3.30(m, —$CH_2$—), 3.52-3.64(m, —$CH_2$—). IR spectroscopy produced an absorption peak (1716, 1635 cm$^{-1}$($v_{C=O}$)) due to the carbonyl group and an absorption peak at (1192, 1055 cm$^{-1}$($v_{S=O}$)) due to the sulfonic acid group.

The polyamide sulfamic acid formed by the above process is soluble in DMF, DMAc, NMP, DMSO, etc., and insoluble in water, methanol, chloroform, hexane, benzene, or toluene.

In addition, elementary analysis of sulfur in the polymer was performed. The amidosulfonate group of Formula 9 has a concentration ratio (a/b) of 9:1.

The obtained polyamide sulfamic acid (9) was dissolved in DMAc, and the resulting product was cast on a glass plate, heated and dried at 60° C. to obtain a light brown transparent membrane.

Example 2

[Preparation of Polyvinyl Sulfamic Acid Copolymer]

First, 7.21 g of polyacrylic acid (manufactured by Acros Co.) was dissolved in 1 L of dehydrated N,N'-dimethylformamide (DMF), and then 29.7 g of thionyl chloride was slowly added to the resulting solution under a nitrogen atmosphere The polymer solution was stirred at room temperature for 24 hours.

Next, 48.5 g of sulfamic acid (manufactured by Kishida Chemistry Co.) and 50.6 g of triethylamine were mixed with 200 mL of dehydrated dichloromethane to produce amidosulfonate triethylamine salts. Then, the resulting product was slowly added to the polymer solution under nitrogen atmosphere, and stirred at room temperature for 16 hours.

Then, the solvent of the reaction solution was removed in pressure at 50° C., and then 1 L of pure water was added and the resulting product was stirred at room temperature for one hour. The precipitate was separated and washed with pure water, and the resulting product was heated and dried in vacuum at 70° C. for one day to obtain 21.5 g of a light brown powder, which was the polyvinyl sulfamic acid triethylamine salt.

20 g of the resulting powder of polyvinyl sulfamic acid triethylamine salt was dissolved in 1 L of DMF, passed through 2.5 L of cation exchange resin (manufactured by Organo Corp., AMBERLYST® 15JWET) and proton exchanged. The treated solution was concentrated to 100 ml and added to 1 L of pure water to separate the precipitate. Then, the resulting product was washed with pure water, heated and dried in vacuum at 70° C. for one day to obtain a light brown powder of 8.8 g (yield 70%) of polyvinyl sulfamic acid.

The obtained light brown powder was identified, $^1$H-NMR spectroscopy(DMSO-$d_6$, 500 MHz) of the powder produced a spectrum of 1.25-1.65(br, —$CH_2$—), 2.10-2.33(br, —CH—). IR spectroscopy produced an absorption peak (1715 cm$^{-1}$($v_{C=O}$)) due to the carbonyl group and an absorption peak (1179, 1020 cm$^{-1}$($v_{S=O}$)) due to the sulfonic acid group.

The polymer was soluble in DMF, N,N'-dimethylacetamide (DMAc), N-methylpyrrolidone (NMP), dimethylsulfoxide (DMSO), etc, and insoluble in water, methanol, chloroform, hexane, benzene, or toluene.

Thermographic/differential thermal analysis (TG/DTA) measurement of the polymer was performed. The 10% pyrolysis temperature ($T_{d10\%}$) was 260° C., showing excellent heat resistance.

In addition, elemental analysis of sulfur in the polymer was performed. The ratio of n/m was 68/32.

The obtained polymer was dissolved in DMAc, and the resulting product was cast on a glass plate, heated and dried at 60° C. to obtain a light brown transparent membrane.

[Proton Conductivity Measurement]

Figure 2:
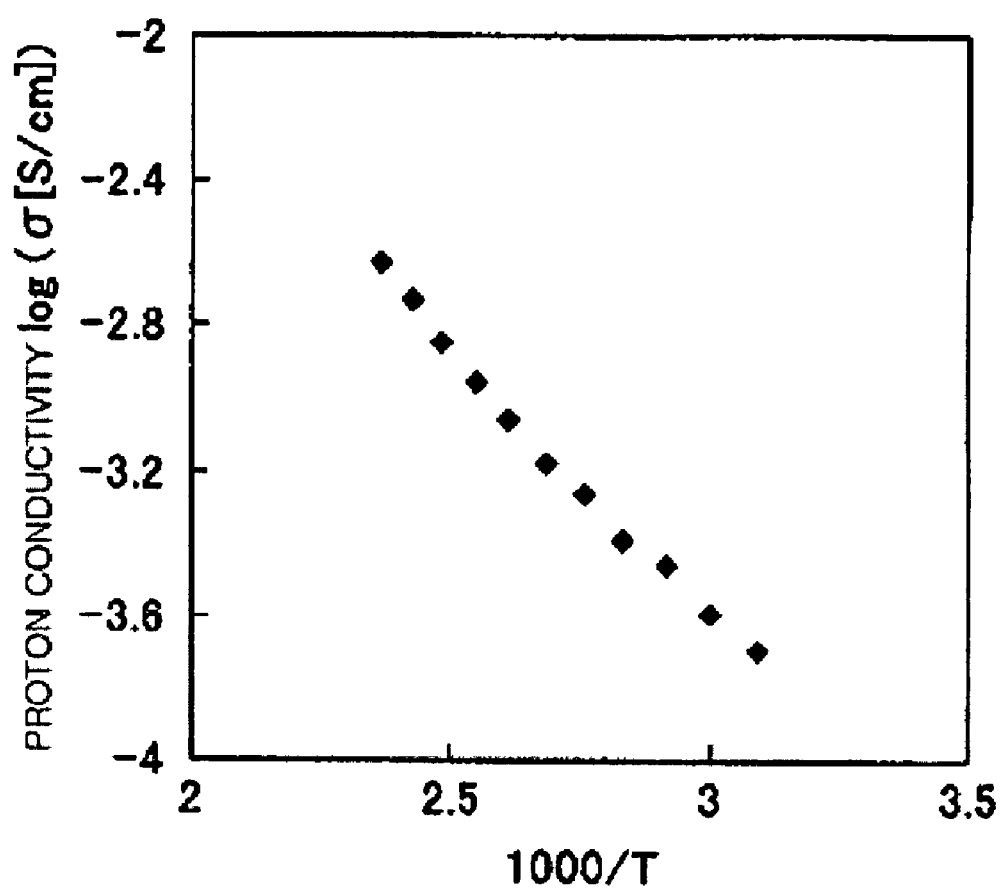
FIGS. 2 and 3 are graphs illustrating the temperature dependence of the proton conductivity of proton conductive electrolytes according to exemplary embodiments of the present invention.
Figure 3:
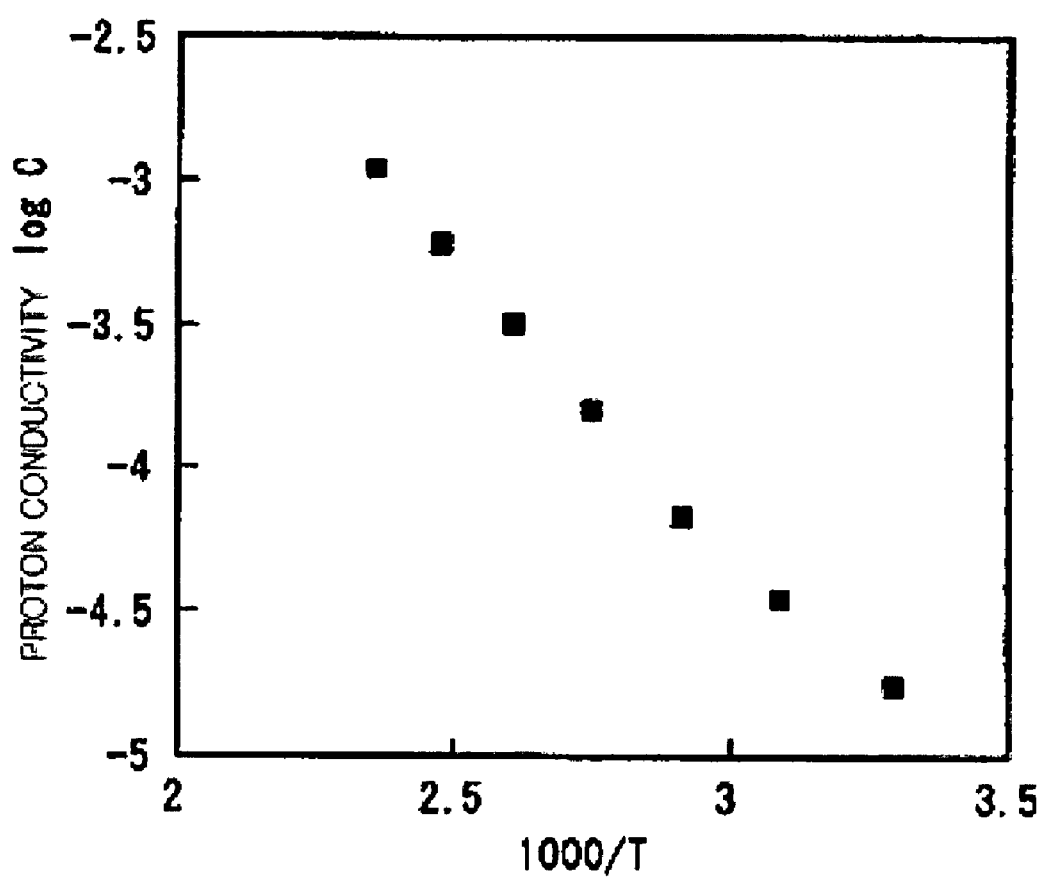

The proton conductive electrolyte membranes of Examples 1 and 2 were inserted into a circular plate-shaped platinum electrode having a diameter of 13 mm, and ion conductivity was determined by complex impedance measurement. FIGS. 2 and 3 are graphs showing the temperature dependence of proton conductivity with respect to the proton conductive electrolyte membranes of Examples 1 and 2, respectively.

In addition, as shown in Table 2, in the case of the proton conductive electrolyte membrane of Example 1, the ion conductivity at 150° C. was $3.2 \times 10^{-3}$ Scm$^{-1}$. As shown in Table 4, in the case of the proton conductive electrolyte membrane of Example 2, the ion conductivity at 150° C. was $1.1 \times 10^{-3}$ Scm$^{-1}$.

[Evaluation of Fuel Cell]

Next, carbon powder in which platinum was supported in an amount of 50 weight % of the carbon powder was added to a DMAc solution of the electrolyte membranes in Examples 1 and 2, respectively, and the resultant was stirred for 10 minutes to obtain a suspension. Here, a weight ratio of platinum-supported carbon powder and proton conductive electrolyte was controlled to reach 2:1. The suspension was coated on porous carbon bodies (porosity 75%), and the resulting product was dried and used as a porous electrode for a fuel cell.

The electrolyte membrane of Example 1 was inserted between a pair of the porous electrodes and the combination used as a unit cell. Hydrogen and air were applied to a fuel and an oxidizing agent, respectively, and a power generation test was performed at 150° C. With the membrane and suspension of Example 1, a voltage of 0.524 V was obtained with respect to an open circuit voltage of 0.985 V along with a current density of 100 mA/cm$^2$. With the membrane and suspension of Example 2, 0.484 V was obtained with respect to an open circuit voltage of 0.900 V along with a current density of 100 mA/cm$^2$.

Examples 3-8

[Other Examples of Electrolyte Membranes]

Instead of using the polyamidic acid (Formula 8) of Example 1, the polymers shown in Table 1 below were used as raw materials, each, polymer prepared by the same method as in Example 1, and mixed with the A/B ratio shown in Table 1 below. Proton conductivity measurements and fuel cell evaluations were performed using an electrolyte membrane prepared by the method of Example 1.

For the A component of Examples 1, 3 and 4, the a/b ratio from Formula 1 was a:b=1.8:0.2. In Examples 5 and 6, the a/b ratio for the A constituent was a:b=1.7:0.3. In Examples 7 and 8, the a/b ratio for the A constituent was a:b=1.9:0.1.

Raw materials and electrolyte constituents in each Example are shown in Table 1, and the results of the evaluations and measurements are shown in Table 2.

TABLE 1

| | Raw materials (polymer) | Electrolyte constituents A | Electrolyte constituents B | | Mixing ratio(A/B) |
|---|---|---|---|---|---|
| Example 1 | [structure] | [structure] | [structure] | — | — |
| Example 3 | [structure] | [structure] | [structure] | $-(CH_2-CH_2)_n-$ with $CONHSO_3H$ | 2/1 |
| Example 4 | [structure] | [structure] | [structure] | $-(CH_2-CH_2)_n-$ with $CONHSO_3H$ | 4/1 |
| Example 5 | [structure] | [structure] | [structure] | — | — |
| Example 6 | [structure] | [structure] | [structure] | $-(CH_2-CH_2)_n-$ with $CONHSO_3H$ | 4/1 |
| Example 7 | [structure] | [structure] | [structure] | — | — |
| Example 8 | [structure] | [structure] | [structure] | $-(CH_2-CH_2)_n-$ with $CONHSO_3H$ | 4/1 |

TABLE 2

| | Proton Conductivity [S/cm] | Open Circuit Voltage [V] |
|---|---|---|
| Example 1 | $3.2 \times 10^{-3}$ | 0.985 |
| Example 3 | $2.2 \times 10^{-3}$ | 0.965 |
| Example 4 | $2.8 \times 10^{-3}$ | 0.978 |
| Example 5 | $2.6 \times 10^{-3}$ | 0.971 |
| Example 6 | $2.2 \times 10^{-3}$ | 0.969 |
| Example 7 | $2.3 \times 10^{-3}$ | 0.969 |
| Example 8 | $1.7 \times 10^{-3}$ | 0.943 |

As shown in Table 2, the electrolyte membrane using the proton conductive electrolyte produced in Examples 3 through 8 also exhibited proton conductivity at 150° C. in the range of $1.7 \times 10^{-3}$ Scm$^{-1}$ (Example 8)-$2.8 \times 10^{-3}$ Scm$^{-1}$ (Example 3), i.e., good proton conductivity. In addition, as in Example 1, a high quality fuel cell was obtained by using such a proton conductive electrolyte.

Examples 9-13

[Other Examples of Electrolyte Membranes]

Instead of using the polyacrylic acid as in Example 2, the polymers shown in Table 3 below were used as a raw material, each polymer, prepared by the same method as in Example 2The components were mixed in the ratio shown in Table 3 below, and proton conductivity measurements and fuel cell evaluations were performed using an electrolyte membrane prepared by a method of Example 2.

For the B component in Examples 9-11, the a/b ratio (formula 1) was a:b=1.6:0.4 For the B component in Examples 12 and 13, the a/b ratio was a:b=1.9:0.1.

Raw materials and electrolyte constituents in each Example are shown in Table 3, and the results of the evaluations and measurements are shown in Table 4.

TABLE 3

| | Electrolyte constituents | | | |
|---|---|---|---|---|
| | Raw materials (polymer) | A | B | Mixing ratio (A/B) |
| Example 2 | —(CH$_2$—CH$_2$)—$_n$(CH$_2$—CH$_2$)$_m$—<br>　　　　　　　　COOH | —(CH$_2$—CH$_2$)—$_n$(CH$_2$—CH$_2$)$_m$—<br>　　CONHSO$_3$H　　COOH | — | — |
| Example 9 | —(CH$_2$—CH$_2$)—$_n$(CH$_2$—CH$_2$)$_m$—<br>　　COOH　　COOH | —(CH$_2$—CH$_2$)—$_n$(CH$_2$—CH$_2$)$_m$—<br>　　CONHSO$_3$H　　COOH | *—C(=O)—C$_6$H$_3$(CONHSO$_3$H)$_a$(COOH)$_b$—C(=O)—NH—C$_6$H$_4$—O—C$_6$H$_4$—* | 1/2 |
| Example 10 | —(CH$_2$—CH$_2$)—$_n$(CH$_2$—CH$_2$)$_m$—<br>　　CONHSO$_3$H　　COOCH$_3$ | —(CH$_2$—CH$_2$)—$_n$(CH$_2$—CH$_2$)$_m$—<br>　　CONHSO$_3$H　　COOH | *—C(=O)—C$_6$H$_3$(CONHSO$_3$H)$_a$(COOH)$_b$—C(=O)—NH—C$_6$H$_4$—O—C$_6$H$_4$—* | 1/4 |
| Example 11 | 　　　　CH$_3$<br>—(CH—CH$_2$)—$_n$(CH$_2$—CH$_2$)$_m$—<br>　　COOH　　COOCH$_3$ | 　　　　CH$_3$<br>—(CH—CH$_2$)—$_n$(CH$_2$—CH$_2$)$_m$—<br>　　COOH　CONHSO$_3$H　COOCH$_3$ | *—C(=O)—C$_6$H$_3$(CONHSO$_3$H)$_a$(COOH)$_b$—C(=O)—NH—C$_6$H$_4$—O—C$_6$H$_4$—* | 1/3 |
| Example 12 | —(CH$_2$—CH$_2$)—$_n$(CH$_2$—CH$_2$)$_m$—<br>　　CONHSO$_3$H　　OCH$_3$ | —(CH$_2$—CH$_2$)—$_n$(CH$_2$—CH$_2$)$_m$—<br>　　CONHSO$_3$H　　OCH$_3$ | *—C(=O)—C$_6$H$_3$(CONHSO$_3$H)$_a$(COOH)$_b$—C(=O)—NH—C$_6$H$_4$—* | 1/5 |
| Example 13 | —(CH$_2$—CH$_2$)—$_n$(CH$_2$—CH$_2$)$_m$—<br>　　COOH　　Cl | —(CH$_2$—CH$_2$)—$_n$(CH$_2$—CH$_2$)$_m$—<br>　　CONHSO$_3$H　　Cl | *—C(=O)—C$_6$H$_3$(CONHSO$_3$H)$_a$(COOH)$_b$—C(=O)—NH—C$_6$H$_4$—* | 1/5 |

TABLE 4

|  | Proton Conductivity [S/cm] | Open Circuit Voltage [V] |
|---|---|---|
| Example 2 | $1.1 \times 10^{-3}$ | 0.900 |
| Example 9 | $1.3 \times 10^{-3}$ | 0.932 |
| Example 10 | $9.5 \times 10^{-4}$ | 0.842 |
| Example 11 | $1.0 \times 10^{-3}$ | 0.898 |
| Example 12 | $9.2 \times 10^{-4}$ | 0.854 |
| Example 13 | $8.8 \times 10^{-4}$ | 0.844 |

As shown in Table 4, the electrolyte membrane using the proton conductive electrolyte produced in Examples 9 through 13 also exhibited proton conductivity at 150° C. in the range of $8.8 \times 10^{-4}$ Scm$^{-1}$ (Example 13)~$1.3 \times 10^{-3}$ Scm$^{-1}$ (Example 9), i.e., good proton conductivity. In addition, as in Example 2, a high quality fuel cell was obtained by using such a proton conductive electrolyte.

Comparative Example

Using the methods of Examples 1 and 2, sulfonated polyetheretherketone (PPEK) was dissolved in NMP to obtain a solution, and the resulting solution was cast on a glass plate, and heated and dried at 60° C. to obtain a light brown transparent membrane. Using the prepared membrane, the proton conductivity at 150° C. was measured. However, proton conductivity was not exhibited.

According to aspects of the present invention, a proton conductive electrolyte having high proton conductivity that can be used to form a membrane having good flexibility can be prepared by using polyamidic acid derivatives, and a proton conductive electrolyte having high proton conductivity and good heat resistance can be prepared by using polyvinyl sulfamic acid copolymer. In addition, by using the proton conductive electrolyte in an electrolyte membrane for a fuel cell, aspects of the present invention provide a solid polymer fuel cell having high current density, high power and long life-time in a dry environment (relative humidity of 50% or less) at an operating temperature of 100 to 200° C.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A proton conductive electrolyte comprising:
   a polyamidic acid derivative having a main chain;
   a carboxyl group or a sulfamic acid group incorporated as a side chain in the polyamidic acid derivative; and,
   an alkyl group incorporated in the main chain.

2. The proton conductive electrolyte of claim 1, wherein the polyamidic acid derivative is represented by Formula 1 below:

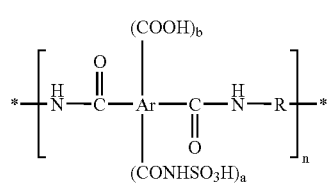

Formula (1)

where Ar is an aromatic ring or a group including an aromatic ring, R is an alkyl group, $0 \leq a \leq 2$, $0 \leq b \leq 2$ and $a+b=2$, and n is the average polymerization degree and is an integer in the range of $10^2$-$10^4$.

3. The proton conductive electrolyte of claim 2, wherein R of the polyamidic acid derivative of Formula 1 is a C3-C12 alkyl group.

4. The proton conductive electrolyte of claim 1, wherein the polyamidic acid derivative is a compound in which the carboxyl group is completely or partially amidosulfonated.

5. The proton conductive electrolyte of claim 4, wherein the polyamidic acid derivative is obtained by completely or partially reacting the carboxylic acid group with carbonyl chloride, reacting the resultant with amidosulfonate triethylamine salts, and then cation exchanging the resulting product.

6. A proton conductive electrolyte according to claim 1, wherein the polyamidic acid derivative is mixed with a polyvinyl sulfamic acid copolymer represented by the formula:

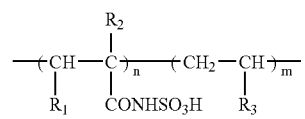

where $R_1$ is H, COOH, CONHSO$_3$H or an aromatic group, $R_2$ is H or CH$_3$, $R_3$ is COOH, an alkoxy group, a halogen group, an ester group or an aromatic group, and each of m and n is an average polymerization degree and is an integer in the range of $10^2$-$3 \times 10^4$.

7. The proton conductive electrolyte of claim 6, wherein the mixing ratio of polyamidic acid derivative and polyvinyl sulfamic acid copolymer is a mass ratio and is in the range of 9/1-1/1.

8. A fuel cell comprising an oxygen electrode and a fuel electrode, an electrolyte membrane interposed between the oxygen electrode and the fuel electrode wherein the electrolyte membrane comprises a proton conductive electrolyte according to claim 6, an oxidizing agent bipolar plate having oxidizing agent flow paths wherein the oxidizing agent flow paths are disposed on the external surface of the oxygen electrode; and a fuel bipolar plate having fuel paths wherein the fuel paths are disposed on the external surface of the fuel electrode.

9. The fuel cell of claim 8, wherein the proton conductive electrolyte according to claim 13 is also incorporated in the oxygen electrode and the fuel electrode.

10. The fuel cell of claim 8, wherein the fuel electrode and the oxygen electrode further comprise a porous catalyzing layer;
   wherein the fuel electrode and the oxygen electrode further comprise a porous carbon sheet supporting the porous catalyzing layer; and
   wherein the porous catalyzing layer further incorporates an electrode catalyst, a hydrophobic binder, and a conducting agent.

11. The proton conductive electrolyte of claim 1, further comprising a polytetrafluoroethylene polymer.

12. The proton conductive electrolyte of claim 1, further comprising a basic polymer wherein the basic polymer is taken from the group consisting of nitrogen-containing polymers, oxygen containing polymers, and sulfur-containing polymers.

13. The proton conductive electrolyte of claim 1, further comprising a phosphate containing compound wherein the phosphate containing compound consists of compounds taken from the group of orthophosphates, metaphosphates, and polyphosphates.

14. A fuel cell comprising an oxygen electrode, a fuel electrode, an electrolyte membrane interposed between the oxygen electrode and the fuel electrode wherein each electrolyte membrane comprises a proton conductive electrolyte according to claim 1, an oxidizing agent bipolar plate having oxidizing agent flow paths wherein the oxidizing agent flow paths are disposed on the external surface of the oxygen electrode, and a fuel bipolar plate having flow paths wherein the fuel paths are disposed on the external surface of the fuel electrode.

15. The fuel cell of claim 14, wherein the proton conductive electrolyte according to claim 1 is also incorporated in the oxygen electrode and the fuel electrode.

16. The fuel cell of claim 14, wherein the fuel electrode and the oxygen electrode further comprise a porous catalyzing layer;
wherein the fuel electrode and the oxygen electrode further comprise a porous carbon sheet supporting the porous catalyzing layer; and
wherein the porous catalyzing layer further incorporates an electrode catalyst, a hydrophobic binder, and a conducting agent.

17. A proton conductive electrolyte comprising a polyvinyl sulfamic acid copolymer represented by Formula 2 below:

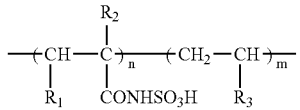

Formula (2)

where $R_1$ is H, COOH, CONHSO$_3$H or an aromatic group, $R_2$ is H or CH$_3$, $R_3$ is COOH, an alkoxy group, a halogen group, an ester group or an aromatic group, and each of m and n is an average polymerization degree and is an integer in the range of $10^2$-$3\times10^4$.

18. A fuel cell comprising an oxygen electrode, a fuel electrode, an electrolyte membrane interposed between the oxygen electrode and the fuel electrode wherein the electrolyte membrane comprises the proton conductive electrolyte according to claim 17, an oxidizing agent bipolar plate having oxidizing agent flow paths wherein the oxidizing agent flow paths are disposed on the external surface of the oxygen electrode, and a fuel bipolar plate having fuel paths wherein the fuel paths are disposed on the surface of the fuel electrode.

19. The fuel cell of claim 18, wherein the proton conductive electrolyte is also incorporated in the oxygen electrode and the fuel electrode.

20. The fuel cell of claim 18, wherein the fuel electrode and the oxygen electrode further comprise a porous catalyzing layer;
wherein the fuel electrode and the oxygen electrode further comprise a porous carbon sheet supporting the porous catalyzing layer; and
wherein the porous catalyzing layer further incorporates an electrode catalyst, a hydrophobic binder, and a conducting agent.

21. The proton conductive electrolyte of claim 17, wherein the average polymerization ratio (n/m) of the polyvinyl sulfamic acid copolymer is 3/7 to 7/3.

22. A proton conductive electrolyte comprising:
at least one polymer having a main chain;
an aromatic ring group incorporated in the main chain;
an alkyl group incorporated in the main chain;
a sulfamic acid group incorporated as a side chain on the aromatic ring group; and,
elements incorporated into each polymer comprising one or more elements selected from the group consisting of carbon, hydrogen, oxygen, nitrogen, sulfur, chlorine, bromine and iodine.

* * * * *